United States Patent
Hendrick et al.

(10) Patent No.: US 9,894,101 B2
(45) Date of Patent: Feb. 13, 2018

(54) AUTONOMOUS AND ADAPTIVE METHODS AND SYSTEM FOR SECURE, POLICY-BASED CONTROL OF REMOTE AND LOCALLY CONTROLLED COMPUTING DEVICES

(71) Applicant: Sequitur Labs Inc., Issaquah, WA (US)

(72) Inventors: Michael Thomas Hendrick, Renton, WA (US); Julia Narvaez, Tacoma, WA (US); Daniel Schaffner, Seattle, WA (US); Abhijeet Rane, Bellevue, WA (US); Simon Curry, Chelmsford, MA (US); Paul Chenard, Corvallis, OR (US); Vincent Ting, Vancouver (CA); Philip Attfield, Fall City, WA (US)

(73) Assignee: Sequitur Labs, Inc., Issaquah, WA (US)

( * ) Notice: Subject to any disclaimer, the term of this patent is extended or adjusted under 35 U.S.C. 154(b) by 0 days.

(21) Appl. No.: 14/728,229

(22) Filed: Jun. 2, 2015

(65) Prior Publication Data

US 2015/0350254 A1 Dec. 3, 2015

Related U.S. Application Data

(60) Provisional application No. 62/006,696, filed on Jun. 2, 2014.

(51) Int. Cl.
*H04L 29/06* (2006.01)
(52) U.S. Cl.
CPC .................... *H04L 63/20* (2013.01)
(58) Field of Classification Search
CPC ...................................................... H04L 63/20
(Continued)

(56) References Cited

U.S. PATENT DOCUMENTS 5,881,225 A 3/1999 Worth
7,140,035 B1 11/2006 Karch
(Continued)

FOREIGN PATENT DOCUMENTS

WO WO 2015/026389 2/2015

OTHER PUBLICATIONS

NFC Forum (2007), "Near Field Communication and the NFC Forum: The Keys to Truly Interoperable Communications" (PDF), http://www.nfc-forum.org, retrieved Oct. 30, 2012.

(Continued)

*Primary Examiner* — John B King
(74) *Attorney, Agent, or Firm* — LaRiviere, Grubman PC (57) ABSTRACT

An autonomous and adaptive method and system for secure, policy-based control of remote and locally controlled computing devices. The invention uses a policy-based access control mechanism to achieve adaptive and dynamic behavior modification based on the context of the local operating environment of the computing device. The modification system assesses the desirability of actions or outcomes as determined by the policy rules and modifies them accordingly, thus altering the behavior of the computing device. The system can utilize a machine learning technique, pattern matching and heuristic evaluation. When applied to the control of robotic and autonomous devices, the system allows the robot to offload adjudication to a remote system and also facilitates cooperative behaviors between robots operating in dynamic environments.

8 Claims, 5 Drawing Sheets

(58) Field of Classification Search
USPC .......................................................... 726/1
See application file for complete search history.

(56) References Cited

U.S. PATENT DOCUMENTS

| | | | | |
|---|---|---|---|---|
| 7,240,015 | B1* | 7/2007 | Karmouch | G06F 9/4875 |
| | | | | 705/4 |
| 7,246,233 | B2 | 7/2007 | Brabson et al. | |
| 7,640,429 | B2 | 12/2009 | Huang et al. | |
| 8,127,982 | B1 | 3/2012 | Casey et al. | |
| 8,285,249 | B2 | 10/2012 | Baker et al. | |
| 8,463,819 | B2 | 6/2013 | Shashikumar et al. | |
| 8,468,586 | B2 | 6/2013 | Koottayi et al. | |
| 2006/0059565 | A1* | 3/2006 | Green | G06F 9/50 |
| | | | | 726/27 |
| 2009/0089125 | A1 | 4/2009 | Sultan | |
| 2009/0204785 | A1 | 8/2009 | Yates, Jr. et al. | |
| 2009/0205016 | A1 | 8/2009 | Milas | |
| 2010/0064341 | A1* | 3/2010 | Aldera | H04L 63/102 |
| | | | | 726/1 |
| 2010/0250370 | A1 | 9/2010 | Jones | |
| 2012/0216012 | A1 | 8/2012 | Vorbach et al. | |
| 2013/0029653 | A1 | 1/2013 | Baker et al. | |
| 2013/0125099 | A1* | 5/2013 | Budiu | G06F 8/41 |
| | | | | 717/140 |
| 2013/0253942 | A1 | 9/2013 | Liu et al. | |
| 2013/0298664 | A1 | 11/2013 | Gillette, II | |
| 2014/0115659 | A1 | 4/2014 | Attheld et al. | |

OTHER PUBLICATIONS

Landt, Jerry (2001), "Shrouds of Time: The history of RFID", AIM, Inc, pp. 5-7.

Bluetooth Special Interest Group website, "A Look at the Basics of Bluetooth Wireless Technology", http://www.bluetooth.com/Pages/Basics.aspx, retrieved Oct. 29, 2012.

See e.g. H. Schildt, C++—The Complete Reference, 2nd edition, pp. 67-70 McGraw Hill, 1995, ISBN 0-07-882123-1.

K. Ashton, That 'Internet of Things' Thing, RFID Journal Jun. 22, 2009 (available online as of Oct. 20, 2013 at http://www.rfidjournal.com/articles/view?4986).

T. White, Hadoop—The Definitive Guide, O'Reilly, 2009, ISBN 978-0-596-52197-4.

Nakamoto, Satoshi. "Bitcoin: A peer-to-peer electronic cash system." Consulted Jan. 2012 (2008): 28. Obtained from http://www.cryptovest.co.uk/resources/Bitcoin%20paper%20Original.pdf on Apr. 6, 2015.

Bitcoin, Inc., "What are multi-signature transactions?", Obtained from http://bitcoin.stackexchange.com/questions/3718/what-are-multi-signature-transactions on Apr. 6, 2015.

Verilog, http://www.verilog.com/, accessed May 12, 2014.

IEEE P1076 Working Group, http://www.eda.org/twiki/bin/view.cgi/P1076, accessed May 12, 2014.

University of British Columbia, Department of Electrical and Computer Engineering, http://www.ece.ubc.ca/~edc/379.ian99/lectures/lec13.pdf, accessed May 12, 2014.

L. Woods, Zs. Istvan, G. Alonso. Ibex (2014) "An Intelligent Storage Engine with Support for Advanced SQL Off-loading." VLDB 2014, Hangzhou, China, Sep. 2014.

PCT/US14/70897, Dec. 17, 2014, Sequitur Lab, Inc.
PCT/US15/24932, Apr. 8, 2015, Sequitur Lab, Inc.
PCT/US15/27561, Apr. 24, 2015, Sequitur Lab, Inc.

"Computer Architecture: A Quantitative Approach", Hennessy J. and Patterson, D., 5th Ed. Morgan Kaufman (2011).

"Computer Networks", Tanenbaum, A. Andrew and Wetherall, D., 5th Ed. Prentice Hall (2010).

"Prolog Programming: A First Course", Brna, P. (Mar. 5, 2001). Retrieved from <http://homepages.inf.ed.ac.uk/pbrna/prologbook/> on Mar. 16, 2013.

* cited by examiner

AUTONOMOUS AND ADAPTIVE METHODS AND SYSTEM FOR SECURE, POLICY-BASED CONTROL OF REMOTE AND LOCALLY CONTROLLED COMPUTING DEVICES

CROSS-REFERENCE TO RELATED APPLICATIONS

This application is entitled to the benefit of, and claims priority to U.S. Provisional Application 62/006,696, filed on Jun. 2, 2014.

TECHNICAL FIELD

The technical fields are: Telecommunications, Computer Security, Digital Communication, Computer Technology, Robotics, Autonomous Vehicles, and IT Methods for Management.

BACKGROUND OF THE INVENTION

One of the areas of computing that is experiencing the most rapid growth is in robotics and autonomous vehicles (UxVs). Herein, the term UxV will be used to refer to unmanned vehicles of any type. These might be aerial vehicles (UAVs), ground vehicles, water borne, subsurface, or any other type. Their common trait it that they are all remotely operated and may include some level of autonomy, although autonomy is not required. The term "robotics" refers to an autonomous vehicle that does more than just move and sense. It also may manipulate its environment with end-effectors that could include any form of tool or grasping mechanism.

All robotics and UxVs contain one or more processors and may contain sensors for sensing the local environment. The sensors may feed data into a processor for automatically managing local control of the vehicle, or it may be fed back to a human operator for local control, or some mix of these two operating modes.

Those vehicle also typically include some form of digital communications for passing data back to their remote operator if there is one, or between vehicles for coordinated behaviors, or some mix of these two modes. Also, there may be more than one type of digital communication used on any one vehicle. It may have an 802.11x variant for wireless high speed communications, it may use cellular networks, and it may also use Bluetooth for short range communications. All of these may be present in some form and more than one form may be present concurrently.

In many ways, robotics and UxVs are similar to ubiquitous mobile devices such as smartphones and tablets and the "Internet of Things" (IoT) with the added capabilities of independent or semi-independent operation. Similar to mobile devices, robotics and UxVs operate in unique computing environments that are constantly changing partly due to an environment that is constantly changing. The environments that robots and UxVs operate in are no more or less secure that any other computing environment. The problem is exacerbated by the fact that these vehicles and devices must commonly function independent of a human operator. Therefore, policy-based control is even more critical for these devices but it must be able to adapt to changing conditions.

What is needed for these types of computing devices is an autonomous and adaptive mechanism for changing security policy in a completely dynamic way. Adaptability to changing conditions is required for this domain. The present invention discloses a system and methods for autonomous and adaptive policy-based control of remote and locally controlled computing devices that addresses these requirements.

SUMMARY OF THE INVENTION

The problem addressed by the present invention is the adaptive management of remote or locally controlled computing devices. The invention is not exclusive to robotics or UxVs and can be applied to any type of computing device where static security policy is either unattainable or unreasonable. The proposed solution uses the policy-based access control and management invention disclosed in U.S. Patent Application 61/673,220 as the basis for the adaptive control invention described herein. The system includes a mechanism for changing security policy based on the context of the operating environment of the computing device. When the computing device is a robot or UxV, the environment changes at it moves or as the surrounding environment changes. The policy-based control system updates the policy rules based on context. The rules can be altered locally using a learning mechanism, or can be altered remotely where a server delivers new rules appropriate for changing conditions. The solution presented herein is superior to existing solutions because it is not only dynamic and adaptive, but is also managed through the policy-based control system allowing highly granular control of every component in the system.

DESCRIPTION OF THE INVENTION

Figure 1:
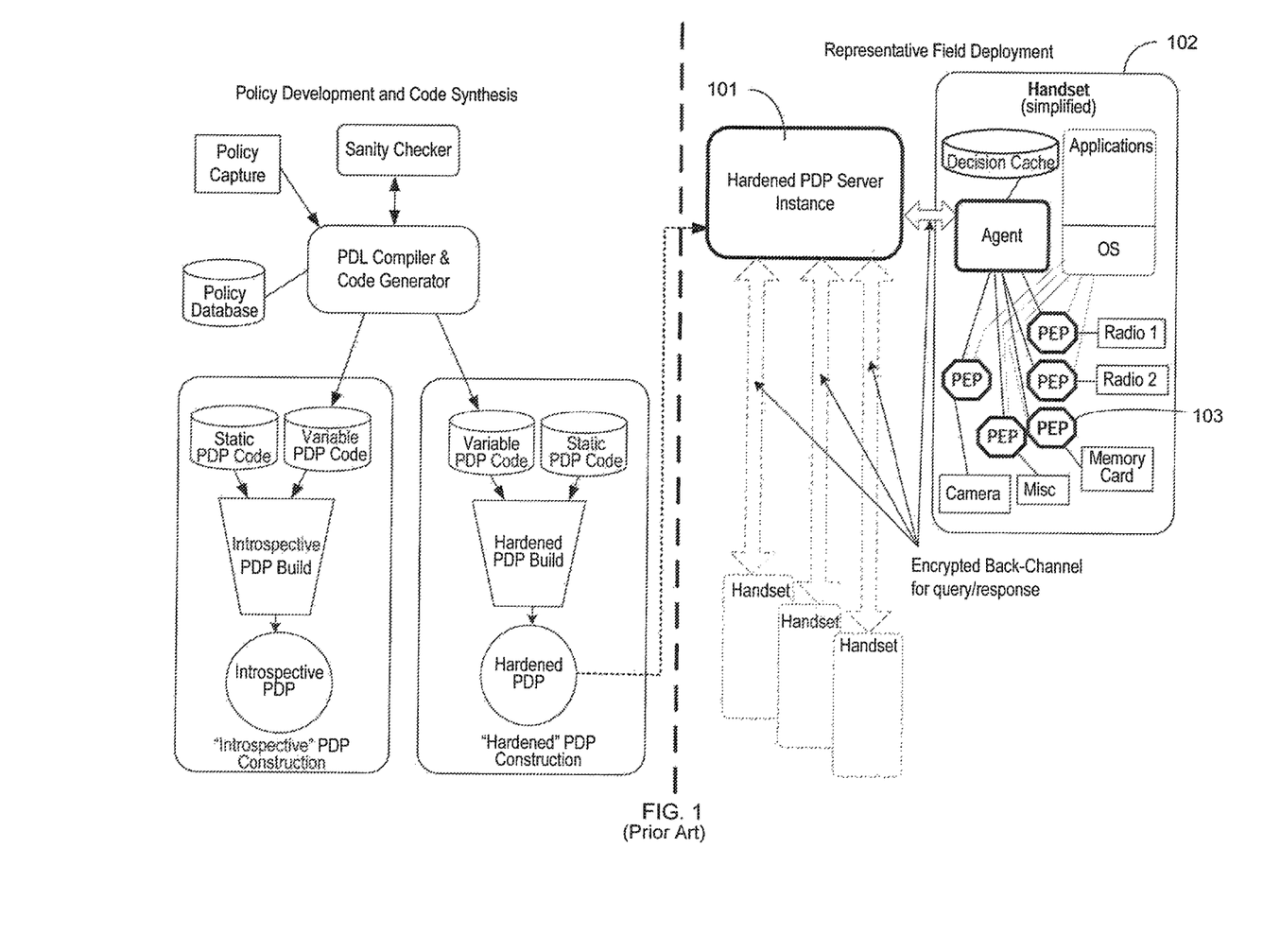
FIG. 1 is a schematic representation of one embodiment of a policy-based device access and control system.

U.S. Patent Application 61/673,220 discloses a system for policy-based access control and management for mobile comparing devices, the disclosure of which is incorporated as if fully set forth herein. Such a system is summarized in FIG. 1. Particularly notable in such a system in the present context is the granularity of control that it allows in regard to permitted operations, plus network, file system, and device access on mobile computers controlled by the system. Furthermore., the system utilizes one or more policy decision point (PDP) servers which respond to encrypted queries from mobile computers controlled by a given instance of the system. These PDP servers may be remote from the mobile computer, or may even be hosted within the mobile computer.

The queries typically encapsulate requests for use of specific mobile computer or network-accessible assets, and the PDP response to such a request is then received by the querying mobile computer, with subsequent decisions made by the PDP then enforced at the Policy Enforcement Points (PEPs) on the mobile computer. Note that for the purpose of brevity in the present description, the term "mobile computer" is used to refer to "smartphone" devices and similar phone devices, but the invention is considered to be generally applicable for the case of any computing device that might be a client in the system.

The present document will begin with a description of how adaptive control can be achieved using the policy-based control system. This will include a discussion of adaptive behaviors and dynamic but granular changes to policy rules based on changing context or conditions of the client. This will be followed by a discussion of how robotics or UxVs can be controlled using this mechanism.

Adaptive Policy Modification and Other Adaptive Behaviors

The threat environment for mobile devices, robots and UxVs changes frequently, with new "malware" and other malicious software and exploits becoming known. Existing policy may be insufficient to respond appropriately to new threats or other conditions not yet encountered. However, new policy can be authored adaptively in response to newly encountered conditions. As a non-limiting example, data collected on an exposed "honeypot" device or server or webserver may detect suspicious requests inbound at a rate exceeding some threshold rate. Policies may then be implemented that result in requests of that form, or from the same network address as the apparent threat, being blocked from devices in the system.

Figure 2:
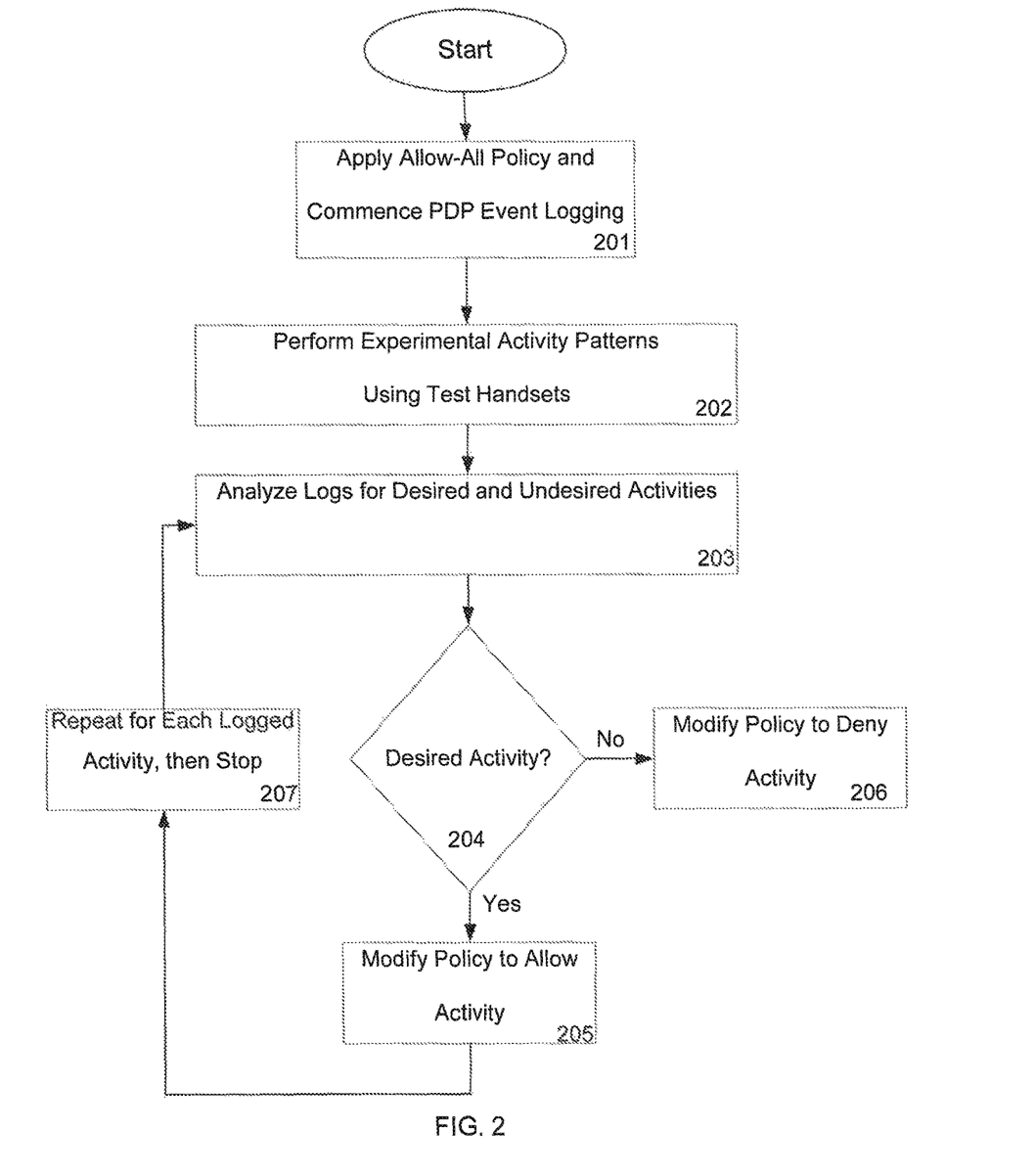
FIG. 2 is a flowchart representation of the steps describing how the system adapts due to changing conditions.
Figure 5:
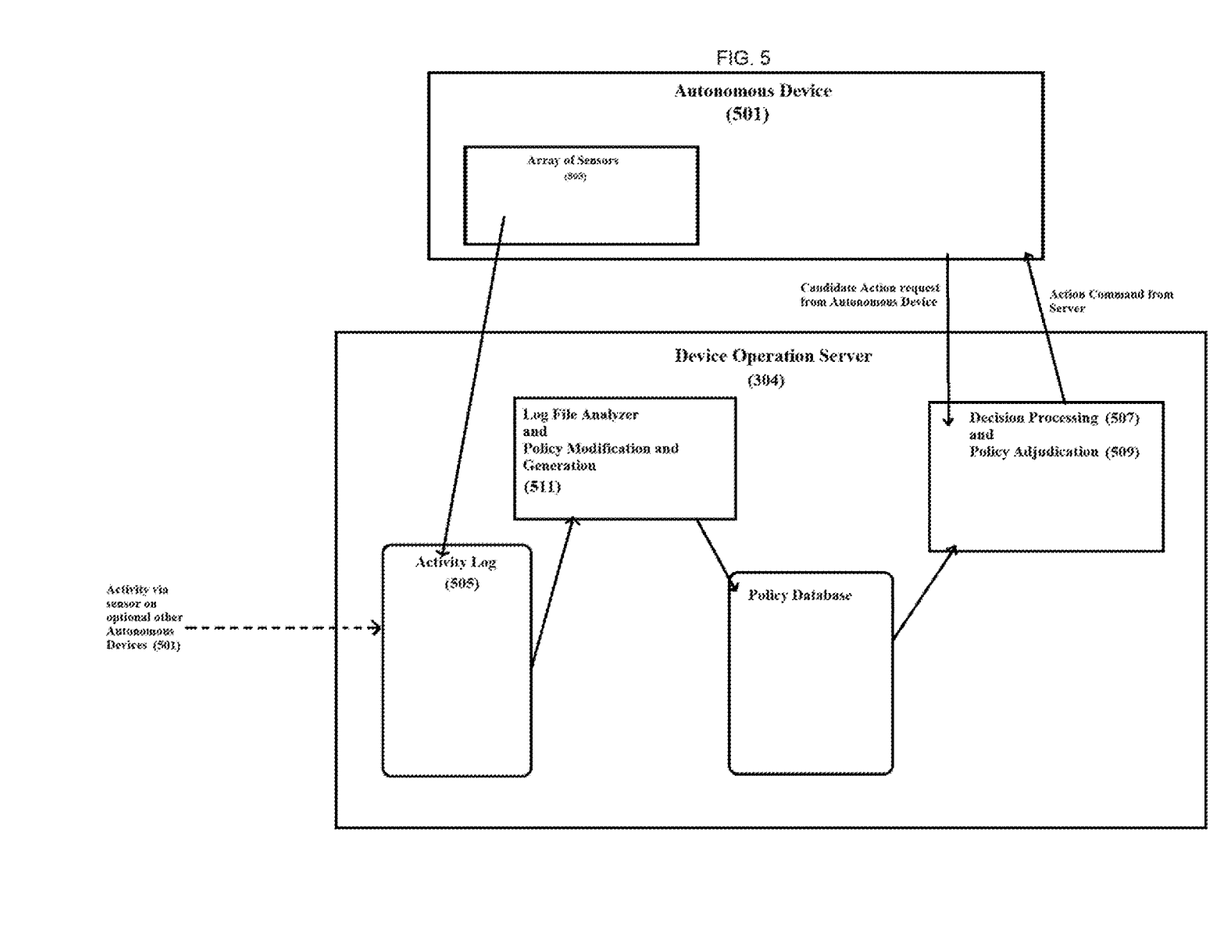
FIG. 5 is a system diagram representation of a series of autonomous devices coupled to adaptive device operation server.

According to FIG. 2 and FIG. 5, adaptive behavior is achieved through the sensing of context (or changes in context) and altering the rules for behavior accordingly. When the environment contains unknowns where the computing device (also robot or UxV) (501) may enter into a context that could not have been anticipated, adaptive behavior can be achieved through adaptive policy modification. The system must be able to change the rules for operation dynamically. FIG. 2 illustrates how this can be achieved using the policy-based control system.

As a default initial condition, the system allows all policies (201) because it does not know anything about the operating environment. However, if anything is known about the initial operating environment a starting set of policy rules can be applied here. PDP logging is also initialized here because these logs are how the system will learn and modify policy rules.

As the computing device (also robot or UxV) (501) operates and moves in its environment sensors (503) probe the environment, collect data, and outcomes can be analyzed (202). The PDP data logs (505) now contain rich vectors of data that link policy rule sets, environmental conditions or context, and "fitness" or "desirability" of the associated activity or outcome. These are he key elements necessary to apply a learning technique that anticipates new context and what policy rules should apply there to obtain the best activity or outcome (203).

As operation continues, if the activity is desirable, then the policy rule set can be modified to allow that activity (205). If the activity is undesirable, then the policy is modified to deny that activity (206). Allowance or denial is implemented through the policy-based system, adjudicated by the PDP (509) and enforced by the PEPs (507). This cycle is repeated for every activity in the PDP log (505) or it can also be performed dynamically as the device, robot, or UxV (501) is operating (207).

As a non-limiting example, an initial policy may authorize phone calls to premium rate numbers under some conditions, such as the mobile device screen being in an active state while the number is dialed. The PDP (509) authorizes the event occurring when a device user purposely makes such a call using a dialer application while the screen is in an active state. When a program attempts a call to a premium number while the screen is not in an active state such as off or locked, the PDP (509) denies the event. The PDP (509), having responded to a query indicative of an unauthorized behavior, and having collected the information of the attack including the premium rate number, then sends warnings of the attempted unauthorized activity to parties such as users, administrators or authorities.

Other ways of using recently collected and historical data to adaptively drive PDP decisions and hence system and device behaviors include:

Aspects of available recorded traffic such as, but not limited to, user agents, frequent or infrequent requests, device types and operating systems can drive policy content and policy triggering (conditions, stipulations, and so on) so that new, appropriate policies can be introduced into active, enabled policy sets.

Traffic of perceived attacks, indications of attack types, or any other suspicious behavior can trigger the following potential responses:

Existing policy can be caused to be enforced (e.g. conditions met such that policy blocks activity)

New policy can be generated

Various warnings may be communicated to users, or administrators or other authorities Policy-Based Management of Autonomous and Partially-Autonomous Devices Using the previously described system for adaptive policy modification in a robot or UxV (501) enables a number of innovations that were heretofore not possible. In the following descriptions, a robot or UxV (501) is equipped with the adaptive policy modification system (511) that is based on the policy-based control system. The robot or UxV (501) also has one or more on-board processors, sensors (503) of any variety, and digital communication capability.

(1) Supplementary or Alternate Decision-Making in Cases Wherein a Robot Cannot or Should Not Solve a Decision Locally It may be the case that local computing resources and/or sensory inputs are insufficient or otherwise inappropriate for making a given decision and then executing action(s) based on that decision. Alternately, for supervisory requirements or other reasons, some decision-making for the robot may he required to be made by a remote system or remote entity. For such a case, the policy-based system can be integrated with the robot's local capabilities such that decisions on what actions to take can be made according to expressed policy within the system. This can then be communicated to the robot for action to be taken. One illustrative, non-limiting example of this case is presented in FIG. 3, for the case of image processing on a remote server as part of the decision analysis.

Figure 3:
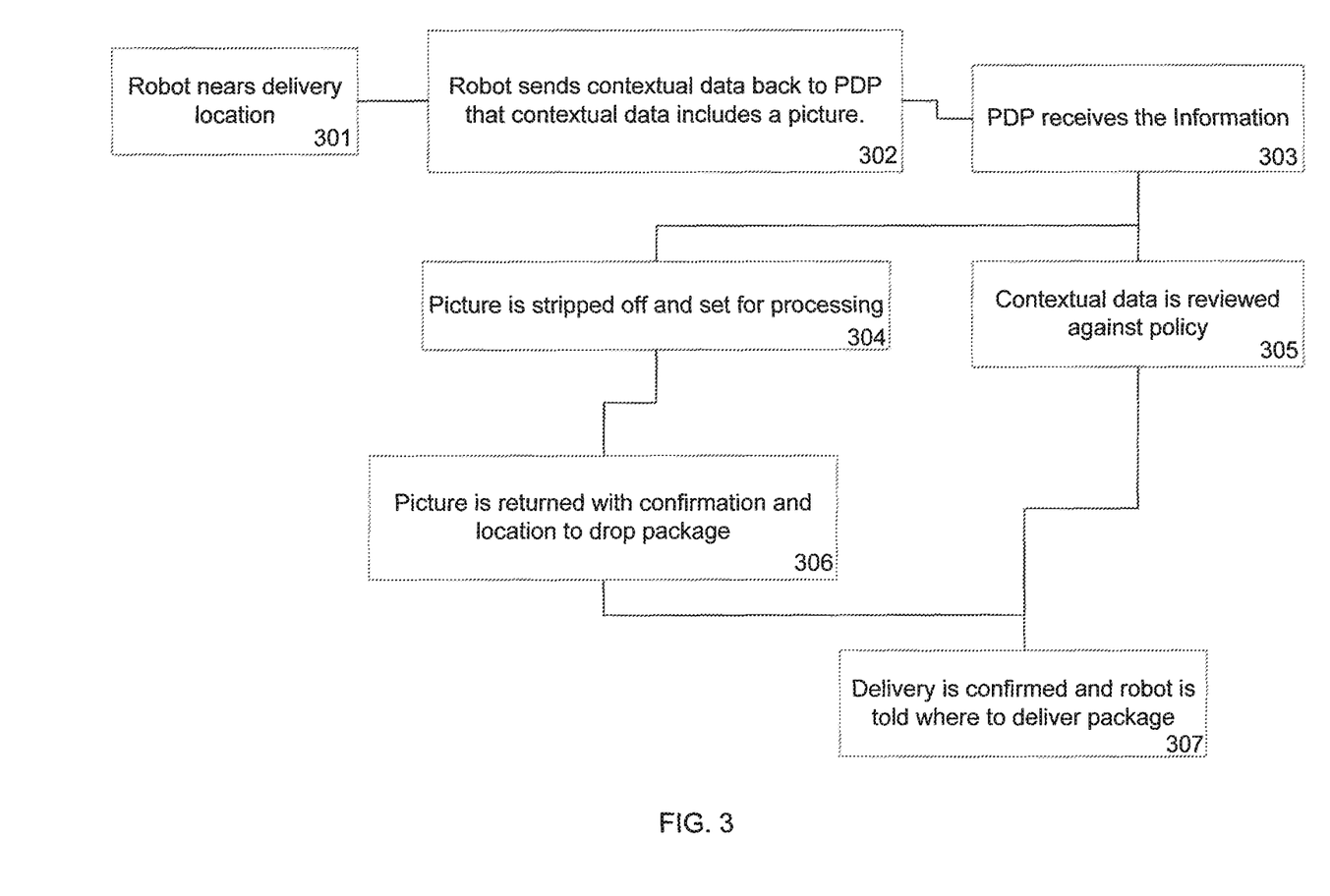
FIG. 3 is a schematic representation of remote image processing coupled with remote policy-based decision analysis for robot-assistive use.

In the example of FIG. 3, a robot is being used for autonomous delivery of a package. As the robot nears a delivery location (301), contextual data that includes imagery, is sent back to a remote PDP (302). The PDP receives the data (303) and separates it into the imagery (304) and the contextual data (305). The contextual data is checked against the policy rules (305) and the system determines where the robot should deliver the package. The imagery is marked with the location (306) and the robot is instructed where to deliver the package (307).

Figure 4:
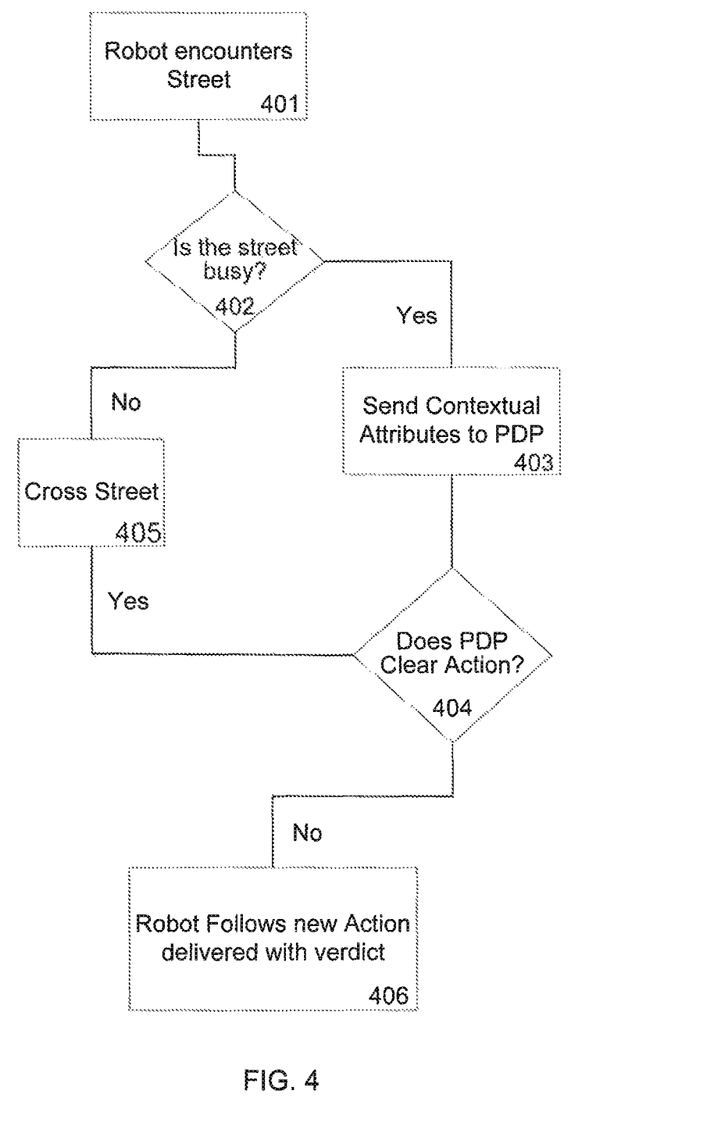
FIG. 4 is a schematic representation of remote decision analysis for robot-assistive use in an urban environment.

As a second non-limiting example of such decision-making, consider a case of a robot with locomotion ability in an urban setting. This is represented in FIG. 4. Here, the robot encounters a street to be crossed (401). It must determine if the street is busy and whether or not it is safe to cross (402). Contextual data is sent to the PDP which may be remote or local on the robot (403). If the PDP clears the robot to cross (404), then the robot executes that command (405). If not, then the PDP must determine a new action (modifying the policy rule set accordingly) and that new action is executed (406).

The decision to adjudicate on the local PDP or to offload to a remote server can be made dynamically. Onboard capabilities may be sufficient in some contexts, such as low vehicle traffic, to decide whether or not the robot should cross a street or enter a building. However, this may be more difficult during times of higher vehicular traffic or other local contextual changes such as movement to a previously untraveled district. In such circumstances, the robot sends contextual information back to the PDP server and requests assistive decision-making before taking an action such as crossing a street or entering a building. Such a received decision can also then be cached locally for later use under similar conditions.

Remote, high-speed decision-making using the policy-based system can allow for robots to be powered by less powerful, less expensive, and potentially less energy consuming, hardware or to operate in challenging and complex decision-making environments.

(2) Managing Cooperation Between Robots

In some cases, multiple robots will be required to operate in a cooperative way in order to accomplish tasks. By way of non-limiting example, like humans, multiple robots will be needed in some cases to lift, pull, and push objects. The policy management infrastructure can effectively trigger for assistance when certain understood criteria are reached. For example, an object to be lifted being beyond a specified weight or size, or being of a certain type requiring multiple lift points and/or complex lifting operations, could be criteria for a decision by the system to require and invoke participation of multiple robots.

(3) Keeping Policy Up-To-Date

If remote devices are exclusively reliant on local (on-device) decision-making and analytic capability, they are vulnerable to obsolete instructions in the case of new contexts that are encountered and to unresolved errors in their software. With the integration of one or more central PDP servers housing synchronized, updated policy sets, such cases of obsolescence can be reduced.

(4) Overall Integration of Policy-Based Decision Making

A variety of integrations of the policy-based access control can be utilized in a system of one or more robots. It is possible for one or more robots to have their decision-making entirely or partially accomplished by such a policy based system. In a simple integration scenario, each robot would take the place of a "Handset" in the representation shown in FIG. 1. By way of non-limiting example, in the case that a large online retailer wishes to deploy a large set of robotic devices (drones) to make deliveries, the activities of the robots can be managed centrally by the system, yet with local context provided by sensors on each robot, and some degree of autonomy if allowed.

(5) Hierarchical, Policy-Based Control of Remote-Controlled Devices and Vehicles Beyond the applications to autonomous and partially autonomous devices as described above, the policy-based access control system can be utilized in management and governance of the operation of remotely-controlled devices such as remotely piloted aircraft, whether or not such devices have my degree of autonomous operation. Specifically, the policy-based system includes hierarchical levels of policy and policy-set ownership.

Policies in policy sets from a high ranking owner can take precedence over policies from a policy owner of lesser authority. As one non-limiting example for the case of remote-controlled vehicles, policies authored by a flight regulatory body or other regulatory authority such as the Federal Aviation Administration would lake precedence in flight governance for a remotely-controlled light aircraft device or drone over those issued by the aircraft or drone owner or operator.

(6) Cooperative Behaviors and Location-Based Policies

The PDP servers in the system typically manage and control a multitude of mobile computing devices. Within the present invention, useful policies and capabilities can be constructed for ensuring beneficial or otherwise cooperative behavior within groups of devices having certain spatial relationships to each other, or other interrelationships.

First in regard to cooperative behaviors, a policy can be composed based on minimum or maximum distance between one designated primary device, and other devices as specified in a list or by membership in a group or set. This would allow for policies that would restrict use of the group devices for certain distance constraints. As one non-limiting example, recording device use could be disallowed if any of the devices in the specified set are within 50 feet of the designated primary device. One scenario for this example would be where devices of government personnel would have all recording hardware such as cameras and microphones restricted if they are 100 feet of the President's phone, that phone being the primary designated device.

Second, in regard lo policy for cooperative behavior, consider the concept of a "bubble of devices", that being a set of devices that would be maintained on the server side. Since the other bubble member devices are not part of the information available to any given phone, the PDP server backend would need to evaluate the positions and/or other parameters regarding current bubble devices within a specified perimeter of the target device or some other applicable constraint, and then accordingly control the other devices.

Third, in certain circumstances, communication between client devices in the system and PDF servers may be impossible. This may become the case as the result of network and connectivity problems, or because of security and privacy constraints for devices operating in the field in secured areas, or for other reasons. For such cases, as has been disclosed in U.S. Patent Application 61/673,220, a local decision cache may be provided on each client device, from which decisions can be looked up in the absence of a response from a PDP server.

This provides an opportunity for further cooperation among client devices, in the system. It may be the case that in the absence of client-to-PDP communication ability, it may still be possible for client devices in the field to communicate with each other. It is also not necessarily the case that all devices will have equivalent versions of decisions in their respective caches. With appropriate permissions, a given client device may access and utilize the decision cache of another client device to obtain a decision result from that cache, in the case that a PDP server response is not available or if the decision result is not otherwise available, such as from the local cache. Thus, the decision cache of one device can become a surrogate cache or local area cache servicing other client devices in the field. As one non-limiting example, this would provide for cooperative assistance between members of a team of robots working together in a given area, for access to decision results that were previously obtained by a team member.

INDUSTRIAL APPLICATION

The invention pertains to industries that may utilize fleets of robotic devices or UxVs or use large numbers of mobile devices that may operate in a coordinated fashion. Delivery services, surveillance drones, maintenance or warehouse robots and policing or physical security are all industrial domains that could benefit from the present invention.

The invention claimed is:

1. A server-based system for policy-based management of autonomous devices in communication with the server, the system comprising:
    a policy based control system, configured to store and apply at least one policy rule for the operation of at least one autonomous device;
    the at least one autonomous device, in communication with the server, and comprising a sensor capable of examining the operating environment of the at least one autonomous device;
    an adaptive policy modification system, configured to modify, create, and delete, the at least one policy rule stored on the server, based on changes to the operating environment of the at least one autonomous device, as measured by the sensor of said at least one autonomous device, resulting from the application of any of said policy rule; and
    wherein the policy based control system and the adaptive policy modification system are implemented by the server.

2. The system of claim 1 including at least one semi-autonomous device.

3. The system of claim 1 further comprising a network interface, and, wherein the server resides either: locally on one or more of the autonomous devices, 4 in communication remotely with the at least one autonomous devices, or a combination thereof.

4. The system of claim 1, comprising a plurality of autonomous devices, and wherein the autonomous devices are configured to execute a task cooperatively based on policy rules.

5. The system of claim 4 wherein the plurality of autonomous devices executing the task cooperatively, execute the task simultaneously.

6. The system of claim 1, further comprising a plurality of policy rules, organized into a hierarchical structure for overriding conflicting policy rules based on the hierarchical level of the policy rule.

7. The system of claim 1, further comprising a plurality of autonomous devices and a network interface, and including a policy sharing system whereby one autonomous device can access the policy rules of any of the other plurality of autonomous devices when network communication between the plurality of autonomous devices are enabled.

8. The system of claim 1 including a central control system whereby a central server controls the at least one autonomous device.

* * * * *